United States Patent
Zhang et al.

(10) Patent No.: US 11,170,301 B2
(45) Date of Patent: Nov. 9, 2021

(54) MACHINE LEARNING VIA DOUBLE LAYER OPTIMIZATION

(71) Applicant: Mitusbishi Electric Research Laboratories, Inc., Cambridge, MA (US)

(72) Inventors: Ziming Zhang, Cambridge, MA (US); Matthew Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1029 days.

(21) Appl. No.: 15/814,568

(22) Filed: Nov. 16, 2017

(65) Prior Publication Data

US 2019/0147340 A1  May 16, 2019

(51) Int. Cl.
*G06N 3/08* (2006.01)
*G06N 3/04* (2006.01)
(Continued)

(52) U.S. Cl.
CPC .......... *G06N 3/082* (2013.01); *G06N 3/0445* (2013.01); *G06N 3/0454* (2013.01);
(Continued)

(58) Field of Classification Search
None
See application file for complete search history.

(56) References Cited

U.S. PATENT DOCUMENTS 9,730,643 B2    8/2017  Georgescu et al.
10,685,285 B2 *  6/2020  Simard ................ G06N 3/0454
(Continued)

FOREIGN PATENT DOCUMENTS

| CN | 106782511 A | 12/2016 |
| CN | 107147995 A | 12/2016 |
| EP | 3091486 A2 | 11/2016 |

OTHER PUBLICATIONS

Su et al., "A Systematic Evaluation of the Bag-of-Frames Representation for Music Information Retrieval", 2014, IEEE Transactions on Multimedia (vol. 16, Issue: 5, Aug. 2014), pp. 1188-1200 (Year: 2014).*

(Continued)

*Primary Examiner* — Miranda M Huang
*Assistant Examiner* — Leon W Cheung
(74) *Attorney, Agent, or Firm* — Gennadiy Vinokur; Hironori Tsukamoto

(57) ABSTRACT

A computer-based system trains a neural network by solving a double layer optimization problem. The system includes an input interface to receive an input to the neural network and labels of the input to the neural network; a processor to solve a double layer optimization to produce parameters of the neural network, and an output interface to output the parameters of the neural network. The double layer optimization includes an optimization of a first layer subject to an optimization of a second layer. The optimization of the first layer minimizes a difference between an output of the neural network processing the input and the labels of the input to the neural network, the optimization of the second layer minimizes a distance between a non-negative output vector of each layer and a corresponding input vector to each layer. The input vector of a current layer is a linear transformation of the non-negative output vector of the previous layer.

18 Claims, 12 Drawing Sheets

(51) Int. Cl.
*G06F 17/10* (2006.01)
*G06Q 10/04* (2012.01)
*G06N 5/02* (2006.01)

(52) U.S. Cl.
CPC ........... *G06N 3/0481* (2013.01); *G06N 3/084* (2013.01); *G06N 5/02* (2013.01); *G06Q 10/04* (2013.01)

(56) References Cited

U.S. PATENT DOCUMENTS

| | | | |
|---|---|---|---|
| 2013/0091081 A1* | 4/2013 | He | G06N 20/00 706/12 |
| 2014/0006471 A1 | 1/2014 | Horia et al. | |
| 2014/0156579 A1* | 6/2014 | Bouchard | G06N 5/043 706/46 |
| 2016/0034810 A1* | 2/2016 | Hershey | G06N 3/0445 706/22 |
| 2016/0307565 A1* | 10/2016 | Liu | G10L 15/16 |
| 2017/0200077 A1 | 7/2017 | Weston et al. | |
| 2018/0285682 A1* | 10/2018 | Najibi | G06K 9/6289 |
| 2019/0150764 A1* | 5/2019 | Arnold | G16H 15/00 |

OTHER PUBLICATIONS

Zhang et al., "Efficient Training of Very Deep Neural Networks for Supervised Hashing", Apr. 21, 2016, arXiv:1511.04524v2 (Year: 2016).*

Bishop, "Training with Noise is Equivalent to Tikhonov Regularization", Jan. 1995, Neural Computation, vol. 7, Issue 1, p. 108-116 (Year: 1995).*

DeVito et al., "A Machine Learning Approach to Optimal Tikhonov Regularization I: Affine Manifolds." A Machine Learning Approach to Optimal Tikhonov Regularation. Arxiv:1610.01952v2 [math.NA] Oct. 12, 2017. pp. 1-39.

Calberto et al., "Convex Learning of Multiple Tasks and Their Structure." Citable URI: http://hdl.handle.net/1721.1/112313. Department: McGovern Institute for Brain Research at MIT. Center for Brains, Minds, and Machines; Massachusetts Institute of Technology. Department of Brain and Cognitive Sciences. Publisher: MIT Press Date Issued: Jul. 2015.

Lorenz et al., "Gradient Descent for Tikhonov Functionals with Sparsity Constraints: Theory and Numerical Comparison of Step Size Rules." Electronic Transactions on Numerical Analysis. vol. 39, pp. 437-463, 2012. Copyright 2012, Kent State University, ISSN 1068-9613.

Amir Beck, Luba Tetruashvili., "On the Convergence of Block Coordinate Descent Type Methods." SIAM J. Optim, 23(4), pp. 2037-2060, 2013.

* cited by examiner $$\min_{\tilde{\mathcal{U}}\subseteq\mathcal{U},\mathcal{V}\in\mathcal{V},\tilde{\mathcal{W}}\subseteq\mathcal{W}} f(\tilde{\mathcal{U}}, \mathbf{V}, \tilde{\mathcal{W}}) \triangleq \sum_i \ell(y_i, \mathbf{V}\mathbf{u}_{i,N}) + \underbrace{\sum_{i,n} \frac{\gamma_n}{2} \left\| \mathbf{u}_{i,n} - \sum_{m \in M_n} \mathbf{W}_{n,m}\mathbf{u}_{i,m} \right\|_2^2}_{311}$$

$$= \sum_i \left\{ \ell(y_i, \mathbf{V}\mathbf{P}\mathbf{u}_i) + \frac{1}{2}\underbrace{\mathbf{u}_i^T \mathbf{Q}(\tilde{\mathcal{W}})\mathbf{u}_i}_{312} \right\}$$

$$= \sum_i \left\{ \ell(y_i, \mathbf{V}\mathbf{P}\mathbf{u}_i) + \frac{1}{2}\underbrace{\left\| \Gamma(\tilde{\mathcal{W}})\mathbf{u}_i \right\|_2^2}_{313} \right\}$$

s.t. $\mathbf{u}_{i,n} \geq 0, \mathbf{n}_0 = \mathbf{x}_i, \forall i, \forall n \geq 1,$

FIG. 3

Algorithm 1 Block Coordinate Descent (BCD) Algorithm for Training DNNs

Input: training data $\{(\mathbf{x}_i, y_i)\}$ and regularization parameters $\{\gamma_n\}$
Output: network weights $\tilde{\mathcal{W}}$ Randomly initialize $\tilde{\mathcal{U}}^{(0)} \subseteq \mathcal{U}, \mathbf{V}^{(0)} \in \mathcal{V}, \tilde{\mathcal{W}}^{(0)} \subseteq \mathcal{W}$;
Set sequence $\{\theta_t\}_{t=1}^{\infty}$ so that $0 \leq \theta_t \leq 1, \forall t$ and sequence $\left\{\sum_{k=t}^{\infty} \frac{\theta_k}{1-\theta_k}\right\}_{t=1}^{\infty}$ converges to zero, e.g. $\theta_t = \frac{1}{t^2}$;

for $t = 1, 2, \cdots$ do $\mathbf{u}_i^* \leftarrow \arg\min_{\mathbf{u}_i \in \mathcal{U}} \ell(y_i, \mathbf{V}^{(t-1)} \mathbf{P} \mathbf{u}_i) + \frac{1}{2} \mathbf{u}_i^T \mathbf{Q}(\tilde{\mathcal{W}}^{(t-1)}) \mathbf{u}_i + \frac{1}{2}(1-\theta_t)^2 \|\mathbf{u}_i - \mathbf{u}_i^{(t-1)}\|_2^2, \forall i$;
$\mathbf{u}_i^{(t)} \leftarrow \mathbf{u}_i^{(t-1)} + \theta_t (\mathbf{u}_i^* - \mathbf{u}_i^{(t-1)}), \forall i$;
$\mathbf{V}^* \leftarrow \arg\min_{\mathbf{V} \in \mathcal{V}} \sum_i \ell(y_i, \mathbf{V} \mathbf{P} \mathbf{u}_i^{(t)}) + \frac{1}{2}(1-\theta_t)^2 \|\mathbf{V} - \mathbf{V}^{(t-1)}\|_F^2$;
$\mathbf{V}^{(t)} \leftarrow \mathbf{V}^{(t-1)} + \theta_t (\mathbf{V}^* - \mathbf{V}^{(t-1)})$;
$\tilde{\mathcal{W}}^* \leftarrow \arg\min_{\tilde{\mathcal{W}} \subseteq \mathcal{W}} \sum_i \frac{1}{2} [\mathbf{u}_i^{(t)}]^T \mathbf{Q}(\tilde{\mathcal{W}}) \mathbf{u}_i^{(t)} + \frac{1}{2}(1-\theta_t)^2 \sum_n \sum_{m \in \mathcal{M}_n} \|\mathbf{W}_{n,m} - \mathbf{W}_{n,m}^{(t-1)}\|_F^2, \forall n, \forall m \in \mathcal{M}_n, \mathbf{W}_{n,m}^* \in \tilde{\mathcal{W}}^*$;
$\mathbf{W}_{n,m}^{(t)} \leftarrow \mathbf{W}_{n,m}^{(t-1)} + \theta_t (\mathbf{W}_{n,m}^* - \mathbf{W}_{n,m}^{(t-1)})$;

end
return $\tilde{\mathcal{W}}$;

FIG. 6C

MACHINE LEARNING VIA DOUBLE LAYER OPTIMIZATION

TECHNICAL FIELD

This invention relates generally to machine learning in computer science, specifically for deep learning sub-area of the machine learning.

BACKGROUND

Machine learning is a field of computer science that gives computers the ability to learn a specific task without being explicitly programmed to accomplish that task. For example, the machine learning allows to represent a complex task as a learned parametric function, which reduces the memory usage required for accomplishing the task and streamlines the performance of the processor performing the task. Machine learning is used in variety of applications such as object recognition, verification & detection, image segmentation, speech processing and control.

Artificial neural networks (ANNs), such as convolutional Neural Networks (CNN), Recurrent Neural Networks (RNN) form a part of the machine learning framework inspired by the biological neural networks. Such neural network based systems learn to do tasks by considering examples, generally without task-specific programming Such a learning process is usually referred as training, i.e., training the neural network. For example, in image recognition, neural network based systems may learn to identify images that contain cats by analyzing example images that have been manually labeled as "cat" or "no cat" and using the analytic results to identify cats in other images.

For example, feed-forward deep neural networks (DNNs) are function approximators wherein weighted combinations inputs are filtered through nonlinear activation functions that are organized into a cascade of fully connected (FC) hidden layers. In recent years, DNNs have become the tool of choice for many technical areas such as machine translation and computer vision. However, before the DNN can accomplish the task, the DNN needs to be trained, which can be a tedious process.

Backpropagation is a method used in artificial neural networks to calculate the error contribution of each neuron after a batch of data is processed. Those errors are used to adjust the weight of each neuron. Typically, the backpropagation method calculates the gradient of the loss function representing a difference between the output of the neural network and the ground truth data. To that end, the backpropagation can use the gradient descent optimization, and can be referred as backward propagation of errors, because the error is calculated at the output and distributed back through the network layers.

Unfortunately, methods for training neural networks face many numerically difficulties in optimizing the weights of the neurons of the neural networks. In some situations, the backpropagation fails to find global or even local optimum for the neural networks. For example, one of the well-known issues is so-called vanishing gradient in back propagation (chain rule differentiation), i.e. the long dependency chains between hidden layers (and corresponding variables) tend to drive gradients to zero far from the optimum. This issue leads to very slow improvements of the model parameters, an issue that becomes more and more serious in deeper networks.

The vanishing gradient problem can be partially ameliorated by network architectures that have shorter input-to-output paths such as ResNet. However, short input-to-output path can be undesirable for some tasks. Accordingly, there is a need to provide training methods for the neural network that do not suffer from the vanishing gradient problem.

SUMMARY

In the context of artificial neural networks, the rectifier is an activation function defined as: $f(x)=x^+=\max(0,x)$, where x is the input to a neuron of a layer of the neural network. This is also known as a ramp function and is analogous to half-wave rectification in electrical engineering. A unit employing the rectifier is also called a rectified linear unit (ReLU).

The rectifier function has biological motivations and mathematical justifications and can be used in neural networks sometimes more effectively than the widely used logistic sigmoid function. Some embodiments are based on recognition that rectifier functions can help at least partially ameliorate a vanishing gradient problem in back propagation that leads to very slow improvements of the parameters of the neural network during the training. However, some embodiments are based on recognition that deep neural networks using the rectifier function can still suffer from the vanishing gradient problem.

Some embodiments are based on realization that when the output vectors of all layers of the neural network are positive, the maximization operation of the rectifier function on the input vectors can be replaced with the minimization of a distance between a non-negative output vector of each layer and a corresponding input vector to each layer. In such a manner, the rectifier function can be formulated as a minimization operation, which allows to formulate the training procedure as a double layer optimization problem. The first layer of the double layer optimization problem includes minimizing a difference between an output of the neural network and the ground truth labels of the input to the neural network, and the second layer of the double layer optimization problem includes minimizing a distance between a non-negative output vector of each layer and a corresponding input vector to each layer.

Some embodiments are based on realization that such double layer optimization problem can be solved using various approximating techniques that do not suffer from the vanishing gradient problem. For example, some embodiments transform the double layer optimization problem into a single layer optimization problem by adding the objective function in the second layer into the objective function in the first layer and merging constraints in the second layer with constraints in the first layer and solve the new single layer optimization problem by alternating optimization.

In addition, some embodiments are based on realization that the single layer optimization problem can be transformed into a Tikhonov regularization by performing a variable replacement in the single layer optimization problem. After such a reformulation, the Tikhonov regularization can be solved with a block coordinate descent. The block coordinate descent method is advantageous because has close-form solutions for updating variables as well as theoretical convergence guarantee. Empirically such a solution reduces the computational time required for training the neural network, as compared with the back propagation with rectifier function performing maximization operation.

Some embodiments are based on realization that the Tikhonov regularization defines a matrix that encodes not only the network weights but also the network architecture, e.g., the number of nodes/layers and the connectivity between different layers. This encoding is essentially a many-to-one mapping, that is, given an architecture of the network the optimal matrix for the application is unique. Mathematically the matrix satisfies the geometric constraints of being symmetric as well as connected (i.e. there exists at least one path between any pair of non-zero entries in the matrix).

In a number of applications, the network architectures are predefined and such an architecture can be conveniently imposed as a constraint on the structure of the matrix defined by the Tikhonov regularization.

Additionally, or alternatively, some embodiments are based on realization that optimization with Tikhonov regularization can even learn the network architecture automatically, as well as the weights for a given task.

Accordingly, one embodiment discloses a computer-based system, including an input interface to receive an input to the neural network and labels of the input to the neural network; a processor to solve a double layer optimization to produce parameters of the neural network, wherein the double layer optimization includes an optimization of a first layer subject to an optimization of a second layer, wherein the optimization of the first layer minimizes a difference between an output of the neural network processing the input and the labels of the input to the neural network, wherein the optimization of the second layer minimizes a distance between a non-negative output vector of each layer and a corresponding input vector to each layer, wherein the input vector of a current layer is a linear transformation of the non-negative output vector of the previous layer; and an output interface to output the parameters of the neural network.

Another embodiment discloses a computer-based method, wherein the method uses a processor coupled with stored instructions implementing the method, wherein the instructions, when executed by the processor carry out at least some steps of the method including receiving ground truth labels of input to the neural network; solving a double layer optimization problem minimizing a difference between an output of the neural network processing the input to the neural network and the ground truth labels of the input to the neural network to produce parameters of the neural network, wherein the minimizing the difference is the first layer of the double layer optimization problem that is subject to minimizing a distance between a non-negative output vector of each layer and a corresponding input vector to each layer forming the second layer of the double layer optimization problem, wherein the input vector of a current layer is a linear transformation of the non-negative output vector of the previous layer; and outputting the parameters of the neural network.

Yet another embodiment discloses a non-transitory computer readable storage medium embodied thereon a program executable by a processor for performing a method. The method includes receiving ground truth labels of input to the neural network; solving a double layer optimization problem minimizing a difference between an output of the neural network processing the input to the neural network and the ground truth labels of the input to the neural network to produce parameters of the neural network, wherein the minimizing the difference is the first layer of the double layer optimization problem that is subject to minimizing a distance between a non-negative output vector of each layer and a corresponding input vector to each layer forming the second layer of the double layer optimization problem, wherein the input vector of a current layer is a linear transformation of the non-negative output vector of the previous layer; and outputting the parameters of the neural network.

BRIEF DESCRIPTION OF THE DRAWINGS

FIG. 3 shows a schematic of the relaxation of the double layer optimization for training DNNs using Tikhonov regularization according to some embodiments.

FIG. 6C shows a pseudo code of the exemplar implementation of the method of FIG. 6B.

DETAILED DESCRIPTION

Figure 1:
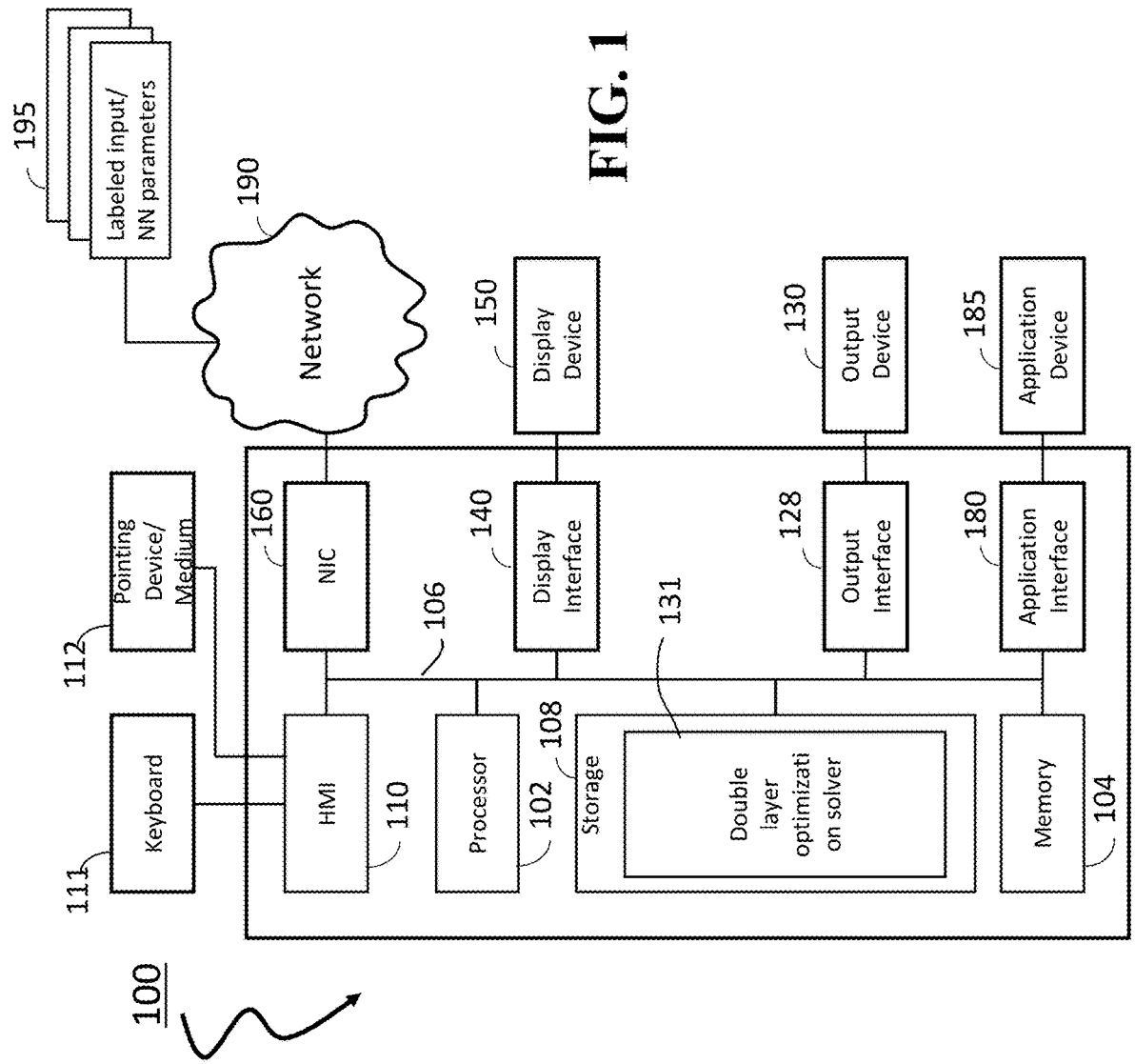
FIG. 1 shows a block diagram of a computer-based processing system 100 for training deep neural networks (DNNs) via double layer optimization in accordance with some embodiments.

FIG. 1 shows a block diagram of a computer-based processing system 100 for training deep neural networks (DNNs) via double layer optimization in accordance with some embodiments. The processing system 100 includes a processor 102 configured to execute stored instructions, as well as a memory 104 that stores instructions that are executable by the processor. The processor 102 can be a single core processor, a multi-core processor, a computing cluster, or any number of other configurations. The memory 104 can include random access memory (RAM), read only memory (ROM), flash memory, or any other suitable memory systems. The processor 102 is connected through a bus 106 to one or more input and output devices.

These instructions implement a double layer optimization solver for training DNNs. In various embodiments, the double layer optimization solver learns weights of a neural network adapted for different applications. For example, in one embodiment, the neural network is trained for image processing, such as face recognition and/or a person re-identification. Additionally, or alternatively, in some embodiments, the neural network is trained for various computer vision tasks, such as one or combination of visual odometry, 3D reconstruction, object detection, object recognition, sensor fusion, and image-based localization.

To that end, the system 100 includes an output interface 128 to output the parameters of the neural network to an output device 130. Examples of the output interface 128 and/or output device 130 include non-transitory computer readable storage medium, a receiver accepting the trained DNN through a wired or wireless communication channel, a display device, and an application device performing a task using the trained DNN. For example, in some embodiments, the system 100 is connected to an application device 185 through an application interface 180. Examples of the application device can be face recognition and identification system, a position encoder, a sensor system, etc.

The processing system 100 is configured to perform the training of DNNs. To that end, the processing system 100 can also include a storage device 108 adapted to store a double layer optimization solver 131 employing some principles of various embodiments. The storage device 108 can be implemented using a hard drive, an optical drive, a thumbdrive, an array of drives, or any combinations thereof. Also, the storage device 108 can store information need to train the DNN. Examples of the training information include labeled input data and/or configuration of the DNN, such as a number of layers of the DNN, the connectivity among layers, and types of the layers.

To that end, the system 100 also includes an input interface to receive the training information, such as an input to the neural network and labels of the input to the neural network. For example, a human machine interface 110 within the processing system 100 can connect the system to a keyboard 111 and pointing device 112, wherein the pointing device 112 can include a mouse, trackball, touchpad, joy stick, pointing stick, stylus, or touchscreen, among others. The processing system 100 can be linked through the bus 106 to a display interface 140 adapted to connect the processing system 100 to a display device 150, wherein the display device 150 can include a computer monitor, camera, television, projector, or mobile device, among others.

Additionally, or alternatively, a network interface controller 160 is adapted to connect the processing system 100 through the bus 106 to a network 190. Through the network 190 and/or other implementations of the input interface, the labeled training data and/or configuration of the DNN 195 can be downloaded and stored within the computer's storage system 108 for storage and/or further processing.

In some embodiments, the processing system 100 is connected to an application interface 180 through the bus 106 adapted to connect the processing system 100 to an application device 185 that can operate based on learned network weights. For example, the device 185 is a protected system allowing its access to the users based on the learned networks.

In the context of artificial neural networks, the rectifier is an activation function defined as: $f(x)=x^+=\max(0, x)$, where x is the input to a neuron of a layer of the neural network. This activation function can be referred as a ramp function and is analogous to half-wave rectification in electrical engineering. A unit employing the rectifier is also called a rectified linear unit (ReLU).

The rectifier function has biological motivations and mathematical justifications and can be used in neural networks sometimes more effectively than the widely used logistic sigmoid function. Some embodiments are based on recognition that rectifier functions can help at least partially to ameliorate a vanishing gradient problem in back propagation that leads to very slow improvements of the parameters of the neural network during the training. However, some embodiments are based on recognition that deep neural networks using the rectifier function can still suffer from the vanishing gradient problem.

Some embodiments are based on realization that when the output vectors of all layers of the neural network are positive, the maximization operation of the rectifier function on the input vectors can be replaced with the minimization of a distance between a non-negative output vector of each layer and a corresponding input vector to each layer. In such a manner, the rectifier function can be formulated as a minimization operation, which allows to formulate the training procedure as a double layer optimization problem. The first layer of the double layer optimization problem includes minimizing a difference between an output of the neural network and the ground truth labels of the input to the neural network, and the second layer of the double layer optimization problem includes minimizing a distance between a non-negative output vector of each layer and a corresponding input vector to each layer.

Figure 2A:
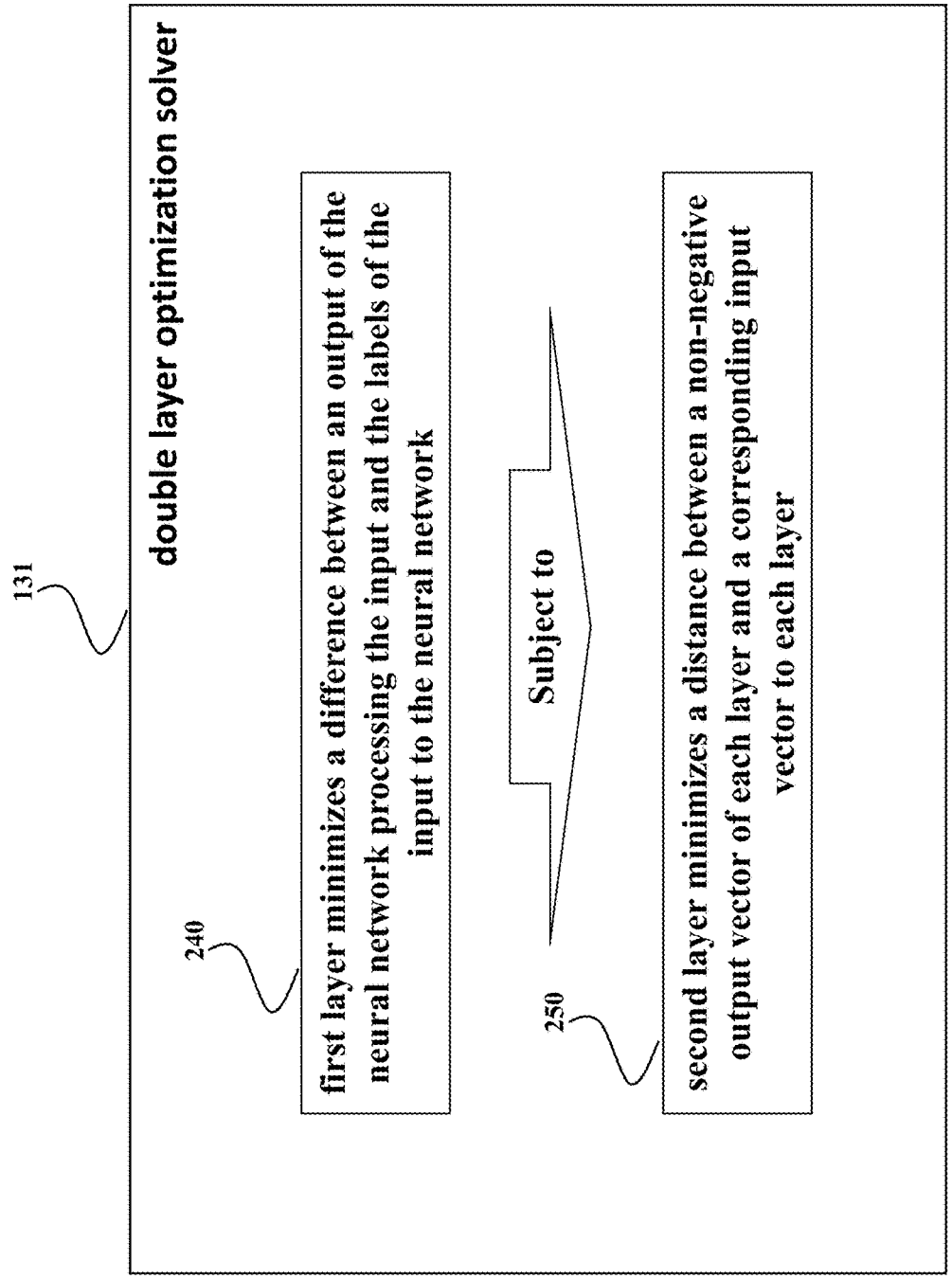
FIG. 2A shows a block diagram of a method for solving a double layer optimization problem to train a neural network according to some embodiments.

FIG. 2A shows a block diagram of a method for solving a double layer optimization problem to train a neural network according to some embodiments. The method can be performed by a processor, such as a processor 102 executing the solver 131 to solve a double layer optimization to produce parameters of the neural network. The double layer optimization includes an optimization 240 of a first layer subject to an optimization of a second layer 250. The optimization of the first layer 240 minimizes a difference between an output of the neural network processing the input and the labels of the input to the neural network. The optimization of the second layer 250 minimizes a distance between a non-negative output vector of each layer and a corresponding input vector to each layer. Notably, the input vector of a current layer is a linear transformation of the non-negative output vector of the previous layer.

Figure 2B:
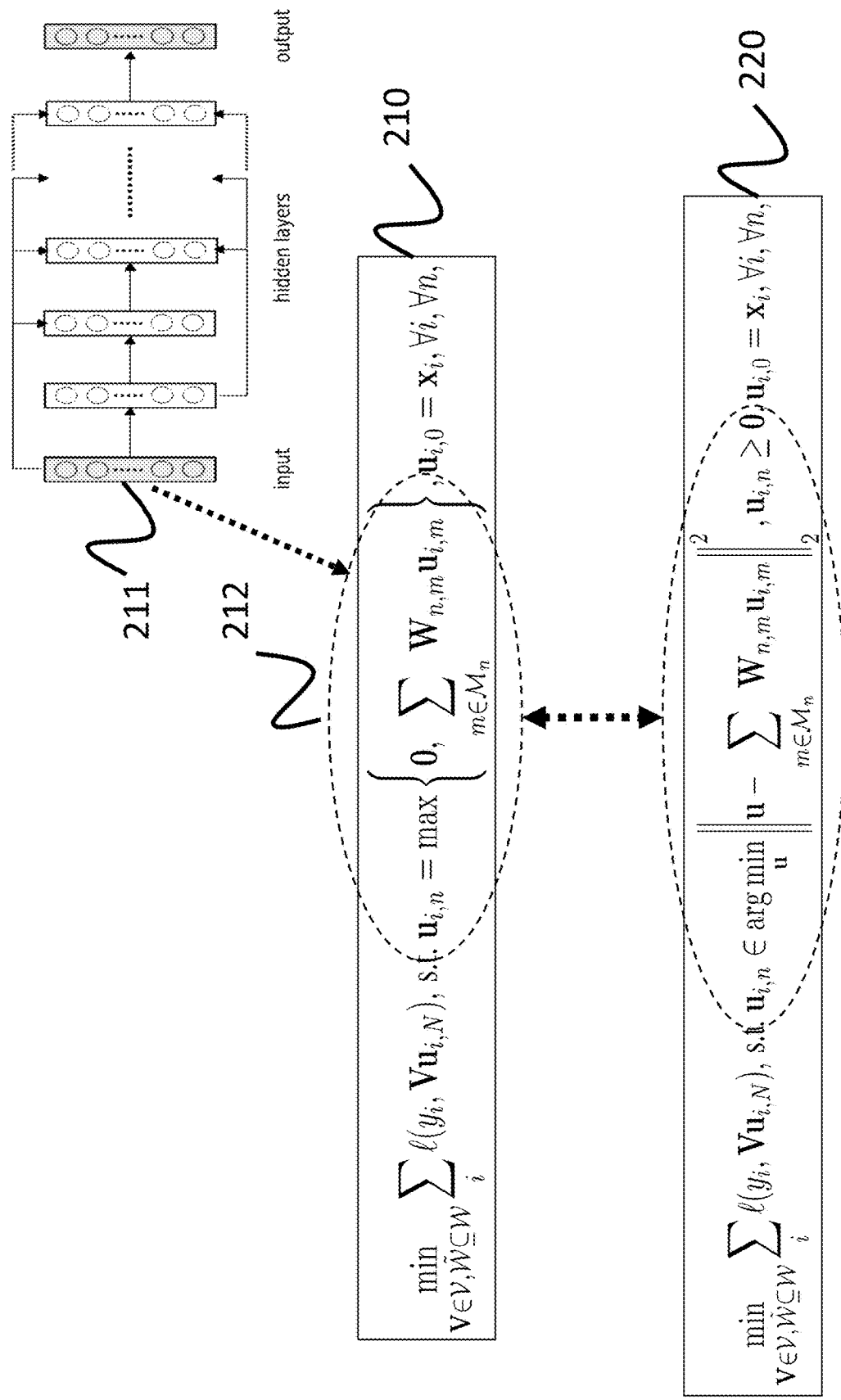
FIG. 2B shows an exemplar schematic of transformation one layer back-propagation optimization to the double layer optimization problem for training DNNs used by some embodiments.

FIG. 2B shows an exemplar schematic of transformation one layer back-propagation optimization to the double layer optimization problem for training DNNs used by some embodiments. In the one layer back-propagation optimization 210, $x_i \in R^{d_0}$ is i-th training data, $y_i \in Y$ is a label from a set of Y, $u_{i,n} \in R^{d_n}$ as the output vector for $x_i$ from the n-th ($1 \leq n \leq N$) hidden layer in the neural network, $W_{n,m} \in R^{d_n \times d_m}$ as a weight matrix between the n-th and m-th hidden layers, $M_n$ as an index set for the n-th hidden layer, $V \in R^{d_{N+1} \times d_N}$ as the weight matrix between the last hidden layer and an output layer of the neural network, U, V, W as nonempty closed convex sets, $\tilde{U}=\{u_{i,n}\}$, $\tilde{W}=\{W_{n,m}\}$, and $l(\bullet,\bullet)$ as a convex loss function. In general, the back-propagation aims to minimize the loss by learning the network weights according to the network architecture.

Some embodiments take advantage of the recognition that maximization of the ReLU activation functions can be replaced with minimization operation. Also, some implementations, to provide short paths through the DNN, allow multi-input ReLU units which can take the outputs from multiple previous layers as its inputs. For example, some embodiments train a neural network having a network architecture 211, where the third hidden layers (with ReLU activations), for instance, takes the input data and the outputs from the first and second hidden layers as its inputs. Accordingly our multi-input ReLU activation function 212 is defined to output the larger value between 0 and the summation of the weighted inputs from other connected layers defined in $M_n$.

Equivalently the ReLU function can be viewed as a projection onto a convex set, and thus rewritten as a simple smooth convex optimization problem with nonnegative constraints on the variables 225. This leads to our double layer optimization problem 220 by replacing the multi-input ReLU function with a second layer optimization problem.

Some embodiments are based on realization that such double layer optimization problem can be solved using various approximating techniques that do not suffer from the vanishing gradient problem. For example, some embodiments transform the double layers optimization problem into a single layer optimization problem by adding an objective function in the second layer into an objective function in the first layer and merging constraints in the second layer with constraints in the first layer and solve the single layer optimization problem by alternating optimization.

In addition, some embodiments are based on realization that the single layer optimization problem can be transformed into a Tikhonov regularization by performing a variable replacement in the single layer optimization problem. After such a reformulation, the Tikhonov regularization can be solved with a block coordinate descent. The block coordinate descent method is advantageous because has close-form solutions for updating variables as well as theoretical convergence guarantee. Empirically such a solution reduces the computation time required for training the neural network, as compared with the back propagation with rectifier function performing maximization operation.

FIG. 3 shows a schematic of the relaxation of the double layer optimization for training DNNs using Tikhonov regularization according to some embodiments. By lifting and unrolling the double layer optimization problem 220, some embodiments obtain the relaxation problem 300, where $u_i$ denotes the concatenating vector of all hidden outputs as well as the input data, $\gamma_n$ 311 is a trade-off parameter controlling the contribution of the loss term and the regularizer, $Q(\tilde{W})$ 312 denotes a positive semidefinite matrix introduced by reorganizing the objective function, and $\Gamma(\tilde{W})$ 313 denotes another matrix induced by $Q(\tilde{W})$ such that $Q(\tilde{W})=\Gamma(\tilde{W})^T\Gamma(\tilde{W})$ where $(\bullet)^T$ denotes the matrix transpose operator. Larger $\gamma_n$ values force $u_{i,n}$ to more closely approximate the output of ReLU at the n-th hidden layer. $Q(\tilde{W})$ or $\Gamma(\tilde{W})$ defines a Tikhonov regularization term. Some embodiments are based on realization that the relaxed problem 300 is a block multi-convex problem, which can be solved efficiently using block coordinate descent (BCD).

Specifically, generic coordinate descent methods use derivative-free optimization to find a local minimum of a function by doing line search along one coordinate direction at the current point in each iteration. The block-coordinate descent used by some embodiments updates just one or a few blocks of variables at a time, rather than updating all the blocks together (the batch update). For example, in one embodiment the block coordinate descent determines a set of variable iteratively, while, for each iteration, the block coordinate descent updates a variable from the set of variables while fixing other variables in the set. Some examples of BCD implementations are provided below.

Some embodiments are based on realization that the Tikhonov regularization defines a matrix that encodes not only the network weights but also the network architecture, e.g., the number of nodes/layers and the connectivity between different layers. This encoding is essentially a many-to-one mapping, that is, given an architecture of the network the optimal matrix for the application is unique. Mathematically the matrix satisfies the geometric constraints of being symmetric as well as connected (i.e. there exists at least one path between any pair of non-zero entries in the matrix).

Figure 4:
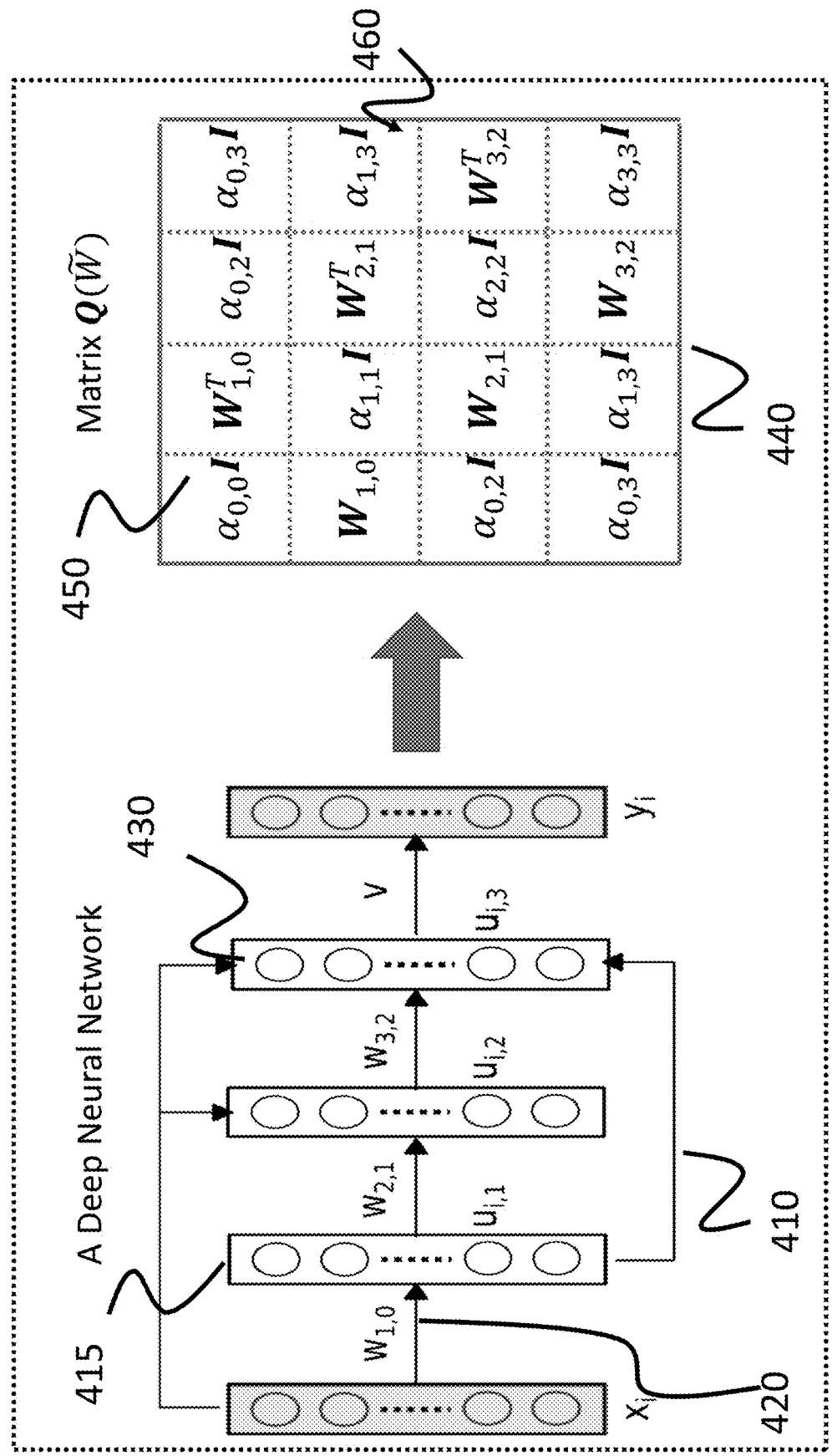
FIG. 4 shows an example of a mapping between a DNN and a matrix defined by the Tikhonov regularizer according to one embodiment.

FIG. 4 shows an example of a mapping between a DNN and a matrix defined by the Tikhonov regularizer according to one embodiment. In the network, each fully connected layer 420 is associated with learned weights, and propagate the information from the previous (hidden) layer 430 to the next layer. For two layers that are not adjacent, there exists a skip layer 410 that allows the information propagated directly without any change. The corresponding square matrix $Q(\tilde{W})$ 440 is constructed with size of square of the total number of nodes in the network. This matrix can further be divided as blocks 450 whose sizes are equal to number of nodes in the input layer times number of nodes in the output layer (or in the reverse order). For instance, for the skip layer 410 the hidden layer 415 is the input layer and the hidden layer 430 is the output layer, and their corresponding block 460 can be written down as a constant $\alpha_{1,3}$ times an identity matrix I.

Some embodiments are based on observation that such maps are actually many-to-one mapping between the network architecture and the matrix. This means that given a network architecture with (learned) weights its corresponding positive semidefinite matrix is unique. On the other hand, however, given the positive semidefinite matrix many networks can be generated due to the very large number of parameters in the networks.

Figure 5A:
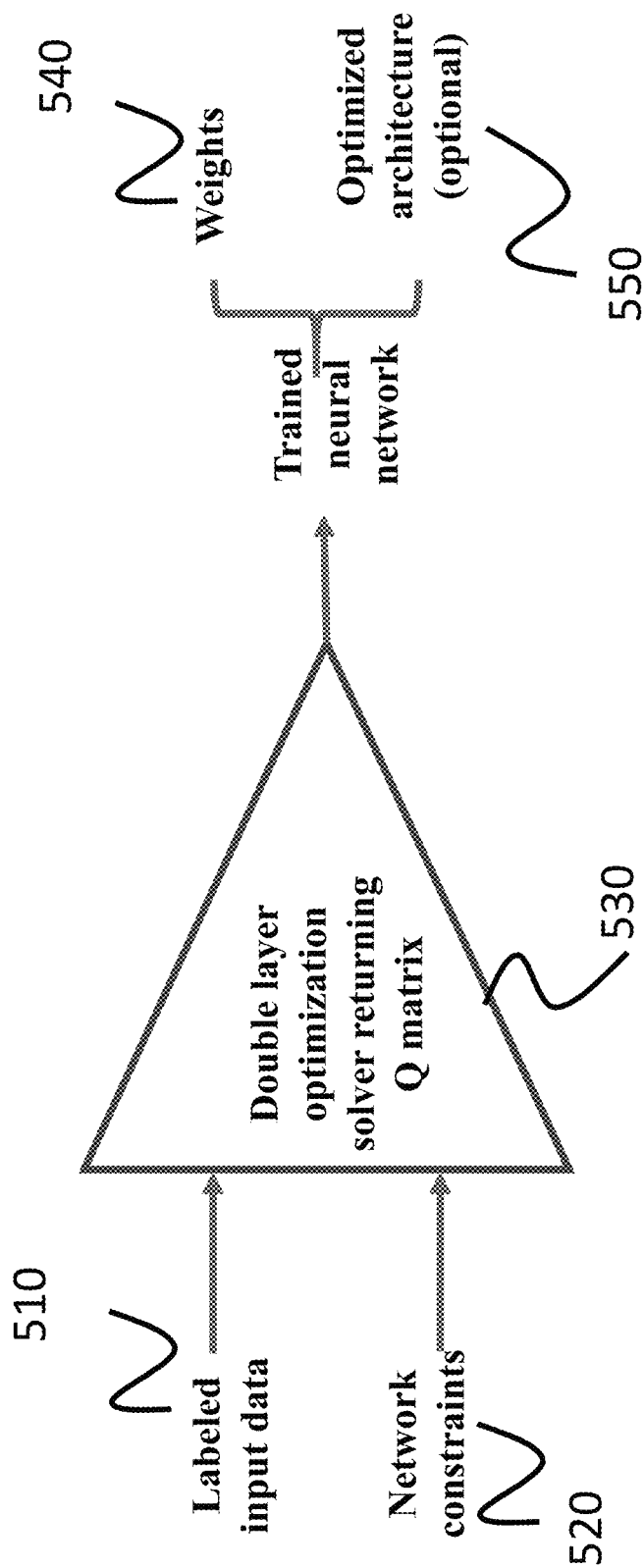
FIG. 5A shows a diagram of a method for training neural networks subject to constraints according to some embodiments.

FIG. 5A shows a diagram of a method for training neural networks subject to constraints according to some embodiments. For an application given training data 510, the network can be learned with architecture constraints 520 defining the architecture of the neural network such as a number of layers and a number of nodes. Additionally, or alternatively, the architectural constraints can be imposed on the network, such as geometric constraints on the layers of the network of being symmetric as well as connected. These architectural constraints are used by the double layer optimization solver, leading to an "optimal" Q matrix 530 to the trained network. Given the Q matrix, some embodiments can recover the weights 540 as well as the architecture 550 of the network if needed. This can be done by solving quadratic constrained quadratic programs (QCQP), because both symmetry and connectivity constraints can be formulated as quadratic terms, and the objective here can be a least square loss between the learned matrix and the recovered one.

Figure 5B:
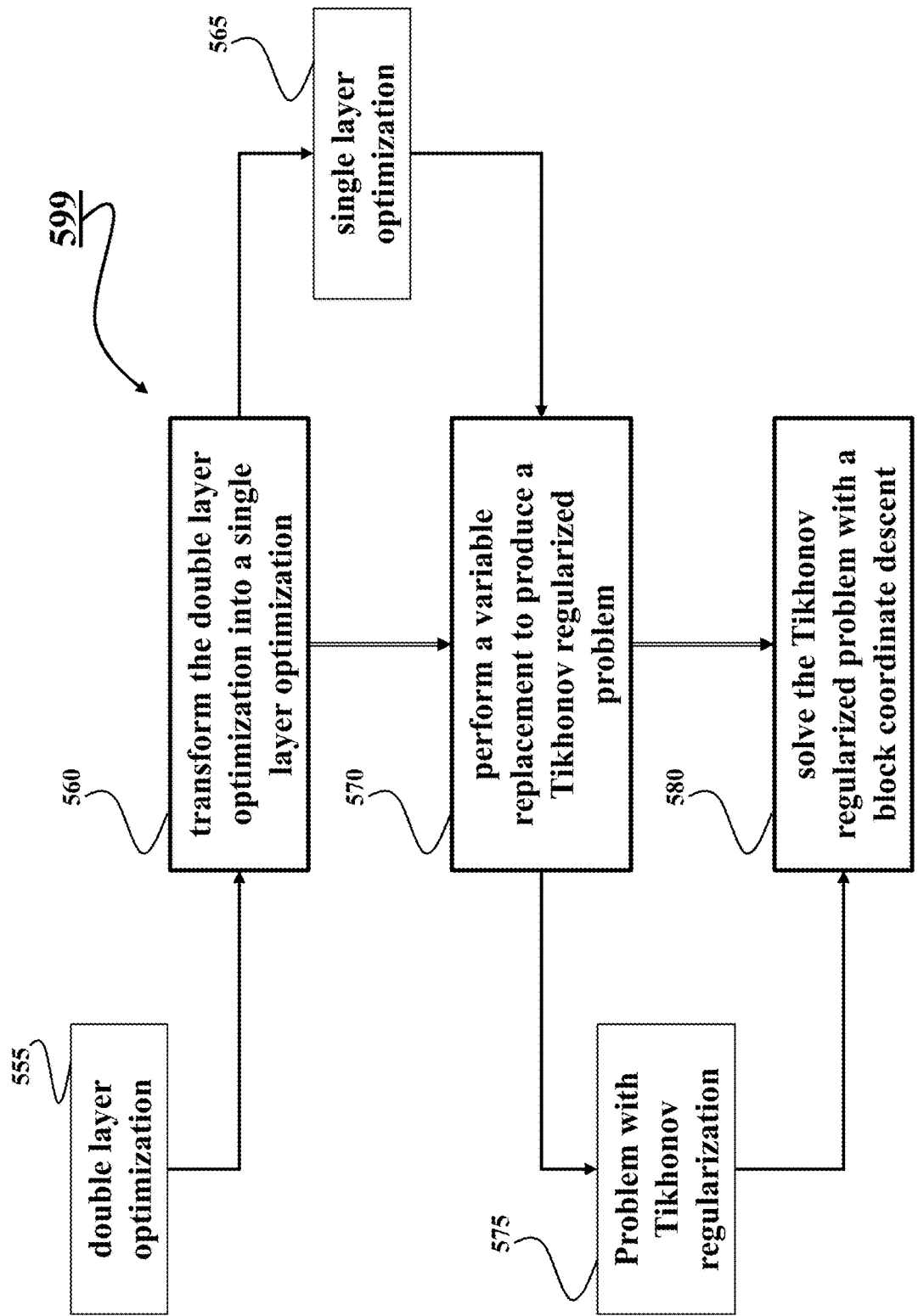
FIG. 5B shows a block diagram of a method 599 for solving the double layer optimization according to one embodiment.

FIG. 5B shows a block diagram of a method 599 for solving the double layer optimization according to one embodiment. The method transforms 560 the double layer optimization 555 into a single layer optimization 565 by adding the objective function in the second layer into the objective function in the first layer and merging constraints in the second layer with constraints in the first layer. The method performs 570 a variable replacement in the single layer optimization problem to produce a Tikhonov regularized problem 575 with a regularization term including a matrix representing an architecture and the parameters of the neural network and solves 580 the Tikhonov regularized problem with a block coordinate descent.

In some implementations, the method 599 receives architectural constraints indicative of the architecture of the neural network and solves the Tikhonov regularized problem subject to the architectural constraints. The architectural constraints can be predetermined and/or received via the input interface. For example, one embodiment initializes the regularization term with a number of layers of the neural network and solves the Tikhonov regularized problem subject to connectivity and symmetry constraints on blocks of the matrix. The embodiment can update the architectural constraints received through the input interface. For example, the number of layers of the neural network can be received through the input interface, e.g., through the network 190.

Figure 6A:
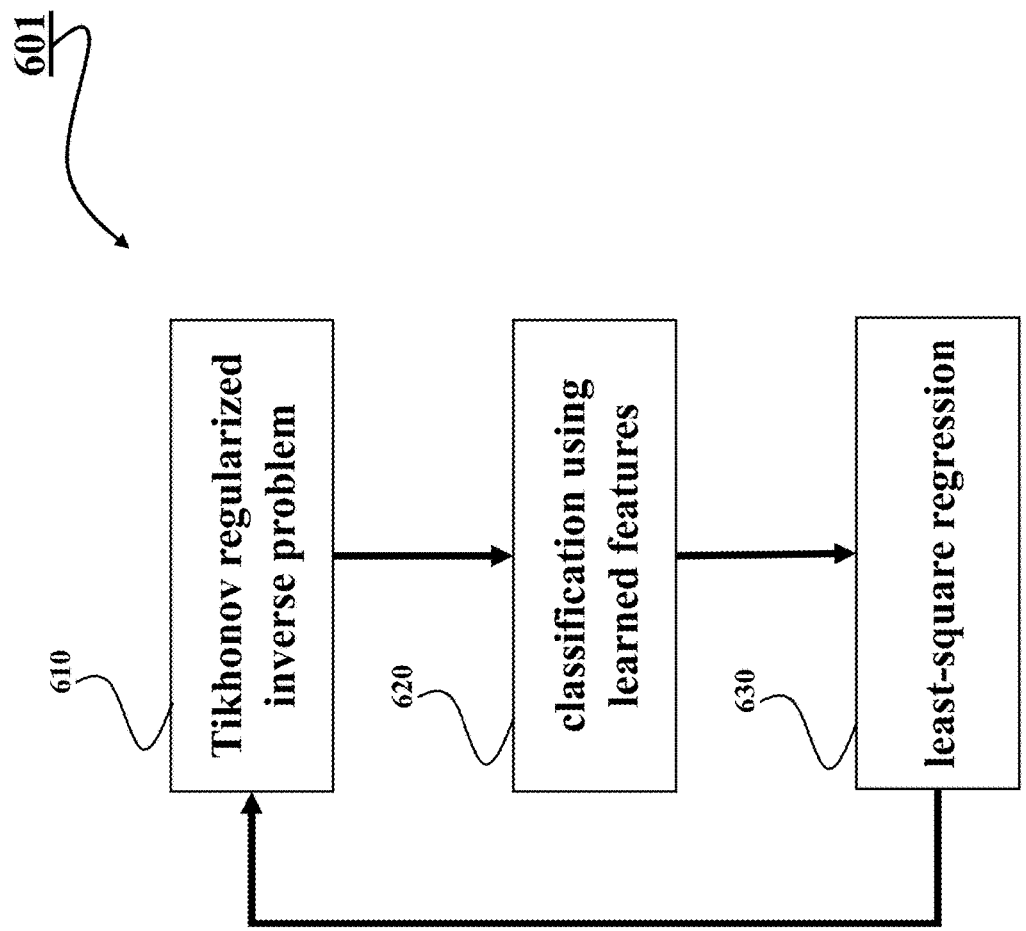
FIG. 6A shows a block coordinate descent method for training Tikhonov regularized DNNs according to one embodiment.

FIG. 6A shows a block coordinate descent method for training Tikhonov regularized DNNs according to one embodiment. This embodiment minimizes the relaxation problem 300 using alternating optimization 601, which decomposes the problem into the following three convex sub-problems: Tikhonov regularized inverse problem 610, classification using learned features 620, and least-square regression 630. All the three sub-problems can be solved efficiently due to their convexity. In fact, the inverse sub-problem alleviates the vanishing gradient issue in traditional deep learning, because these sub-problems obtain the estimated solution for the output feature of each hidden layer, which are dependent on each other through the Tikhonov matrix. In other words, the alternating optimization propagates information between input data and output labels.

Some embodiments are based on recognition that the alternating optimization 601 cannot guarantee the convergence to stationary points for solving the relaxation problem. Therefore, some embodiments modified the alternating optimization 601 by adding an extra quadratic term into each sub-problem and sequentially solve each sub-problem with the extra quadratic term. These extra terms as well as the convex combination rule guarantee the global convergence of the modified alternating optimization.

Figure 6B:
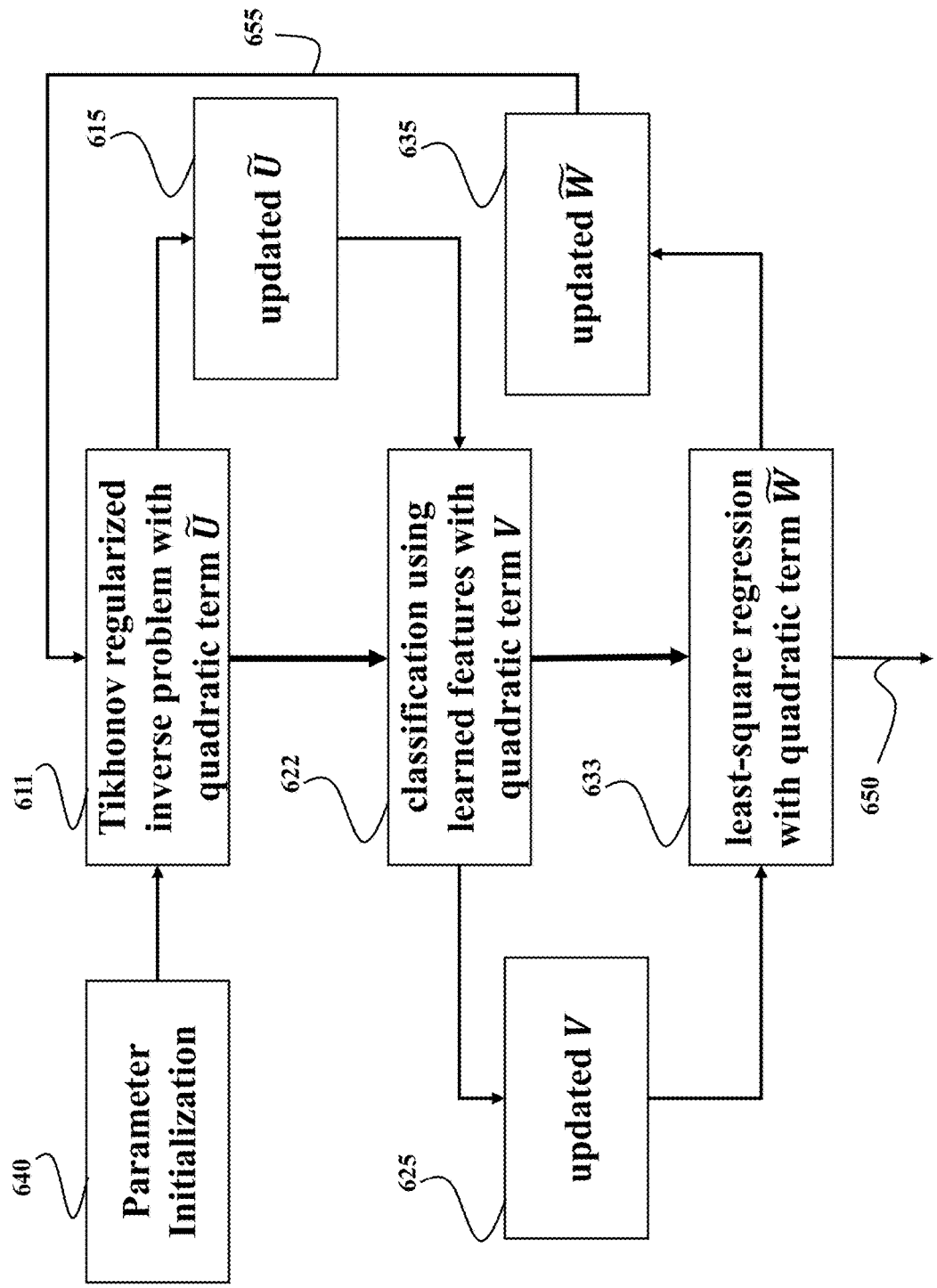
FIG. 6B shows a block diagram of a method for a block coordinate descent modified for training Tikhonov regularized DNNs according to one embodiment.

FIG. 6B shows a block diagram of a method for a block coordinate descent modified for training Tikhonov regularized DNNs according to one embodiment. FIG. 6C shows a pseudo code of the exemplar implementation of the method of FIG. 6B.

The method initializes 640 all the parameters in the relaxation problem for training Tikhonov regularized DNNs. For example, the method initializes all parameters randomly 641. Then the method solves the sub-problems 611, 622, and 633 to update variables $\tilde{U}$ 615, V 625, and $\tilde{W}$ 635 sequentially. For example, the method updates the variable $\tilde{U}$ using the update 612, updates the variable V using the update 623, and updates the variable $\tilde{W}$ using the update 624. The method iterates 650, until variables converge, i.e., a termination condition is met.

Figure 7:
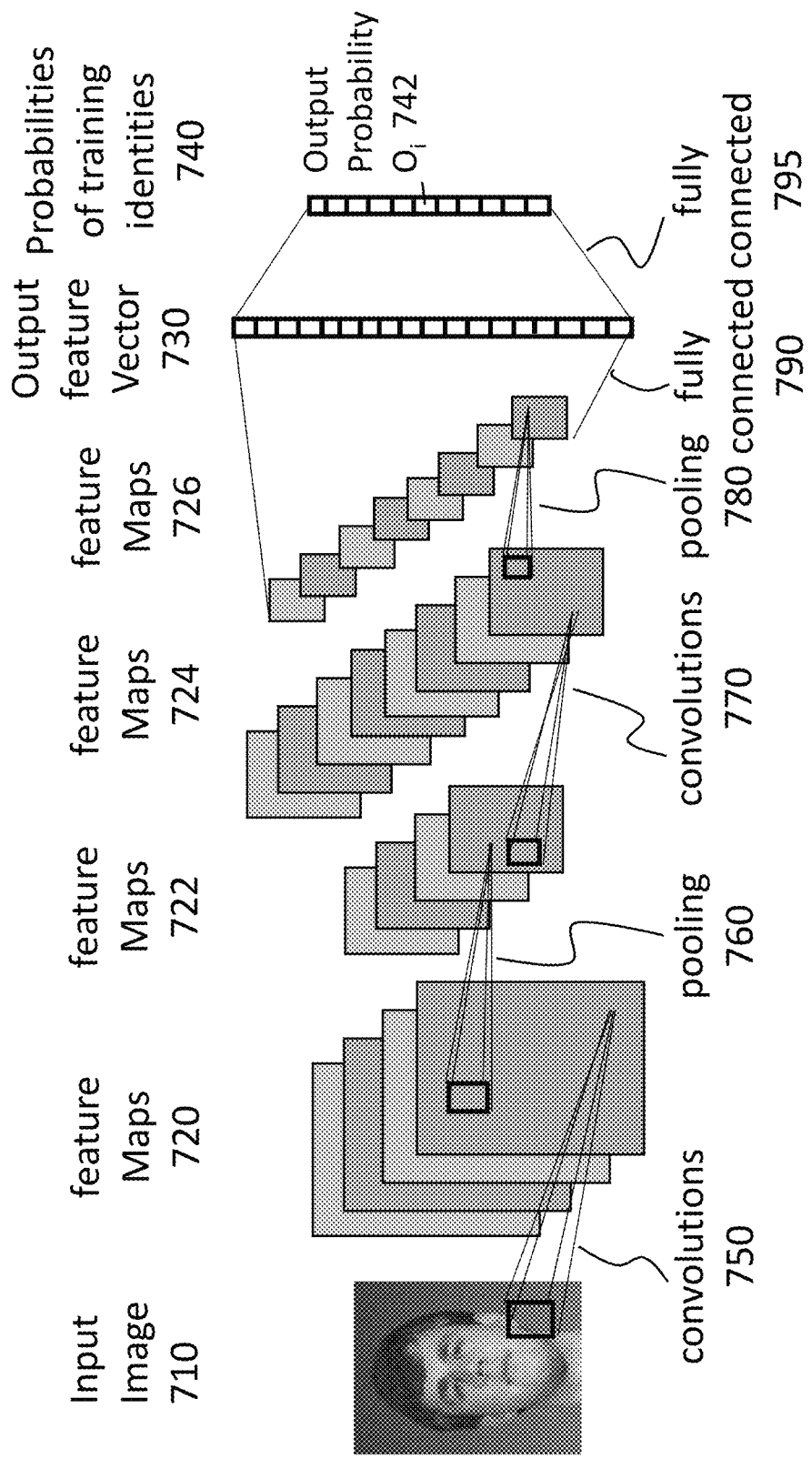
FIG. 7 shows a diagram of an exemplar neural network for image classification trained according to principles employed by some embodiments.

FIG. 7 shows a diagram of an exemplar neural network for image classification trained according to principles employed by some embodiments. The network includes an input layer that takes one or more images as input 710. This input layer is followed by a sequence of convolutional and pooling layers 750, 760, 770, 780. Convolutional layers convolve their input with a set of convolution matrices. Each convolution matrix is used to compute a different output image often called a feature map. The elements of the convolutional matrices are learned during training. ReLU is applied to the feature maps to produce new feature maps. Pooling layers subsample their inputs and output smaller, subsampled feature maps. A convolutional neural network may have any number of convolutional or pooling layers in any order. A convolutional neural network often (but not always) ends with one or more fully connected layers 790, 795. The parameters of the fully connected layers are also learned during training.

In some embodiments, the penultimate layer of a convolutional neural network is a one dimensional vector often called a feature vector 730. In some embodiments, during the training, the ultimate layer of the convolutional neural network 740 is a vector of probabilities indicating the probability that the input image belongs to each of the different training classes. The vector of probabilities is typically generated by computing a softmax function of the vector of numbers computed as different linear combinations of the feature vector. When training a face recognition network, the training classes are the set of different identities in the training set of face images.

In some implementations, a convolutional neural network is trained using the double layer optimization solver that minimizes a user-defined loss function. For example, for a face recognition network, the user-defined loss function may be the Euclidean distance between output probabilities of the network and the ground truth probabilities of the training face images.

During training, for final output unit $O_i$ 742, the weights of the last fully connected layer of the network connected to $O_i$ 742 learn a linear function that tries to map feature vectors for images of person i to 1 and feature vectors for images of all other people to −1. This means that the weights of the last fully connected layer define a separating hyperplane between images of person i and images of all other people. This also implies that the feature vectors learned by the network have the property that the feature vectors for images of a particular identity are linearly separable from the feature vectors of all other people. These feature vectors do not necessarily have the property that the feature vectors for a particular identity are all close together. During testing, the learned features can be used for different applications such as face verification.

Figure 8:
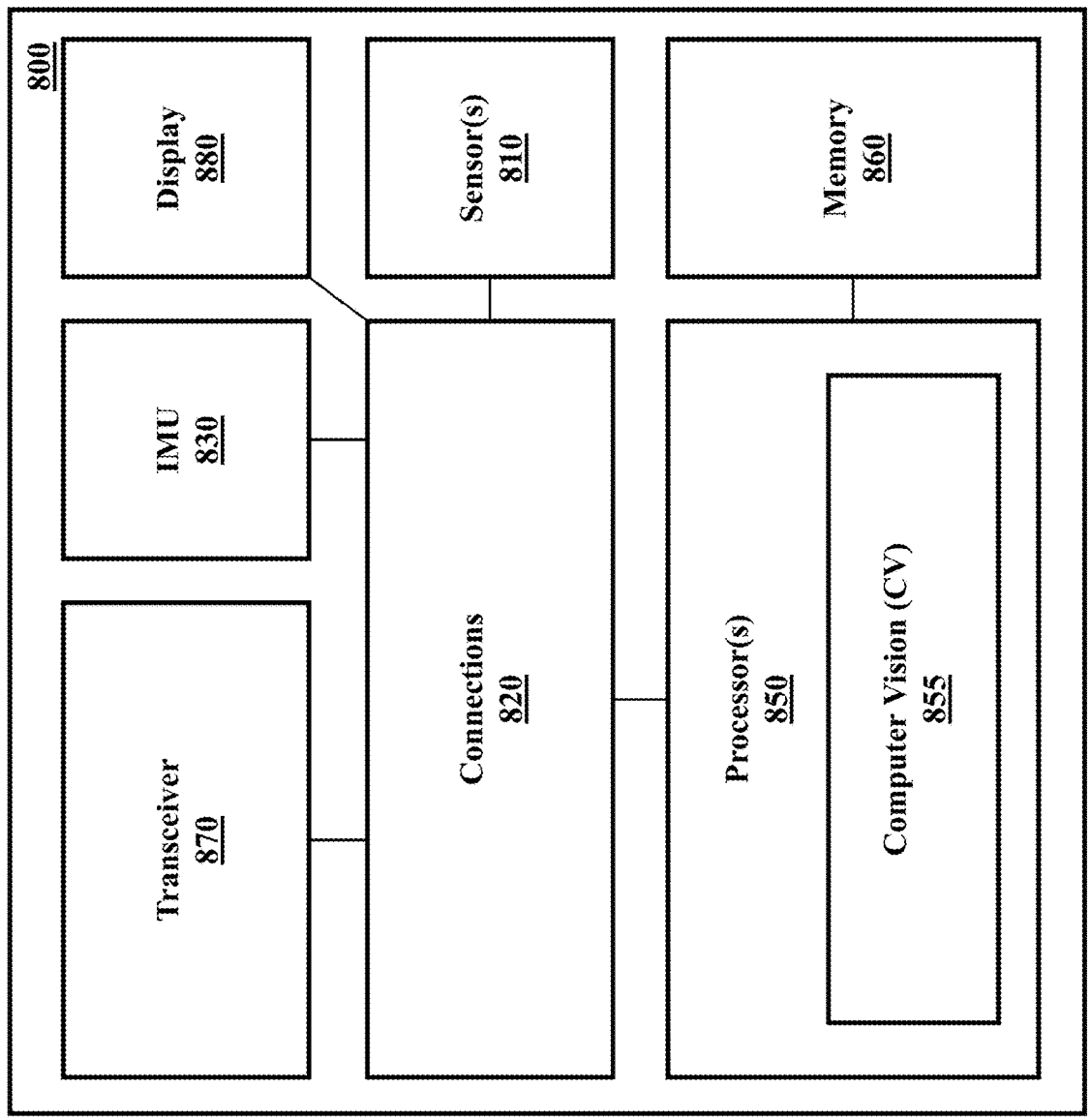
FIG. 8 shows a block diagram of an exemplary system configured for image processing and/or computer vision applications according to some embodiments.

FIG. 8 shows a block diagram of an exemplary system configured for image processing and/or computer vision applications according to some embodiments. The system 800 can include one or combination of a camera 810, an inertial measurement unit (IMU) 830, a processor 850, a memory 860, a transceiver 870, and a display/screen 880, which can be operatively coupled to other components through connections 820. The connections 820 can comprise buses, lines, fibers, links or combination thereof.

The transceiver 870 can, for example, include a transmitter enabled to transmit one or more signals over one or more types of wireless communication networks and a receiver to receive one or more signals transmitted over the one or more types of wireless communication networks. The transceiver 870 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 800 can also include one or more ports for communicating over wired networks.

In some embodiments, the system 800 can comprise image sensors such as CCD or CMOS sensors, lasers and/or camera 810, which are hereinafter referred to as "sensor 810". For example, the sensor 810 can convert an optical image into an electronic or digital image and can send acquired images to processor 850. Additionally, or alternatively, the sensor 810 can sense the light reflected from a target object in a scene and submit the intensities of the captured light to the processor 850.

For example, the sensor 810 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 810 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 810. For example, in some embodiments, the sensor 810 includes RGBD cameras, which may capture per-pixel depth (D) information when the depth sensor is enabled, in addition to color (RGB) images.

As another example, in some embodiments, the sensor 810 can include a 3D Time of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 810. Depth information can be obtained by measuring the time that the light pulses take to travel to the objects and back to the sensor.

As a further example, the depth sensor can take the form of a light source coupled to the sensor 810. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 810 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 800 can be operatively connected to multiple sensors 810, such as dual front cameras and/or a front and rear-facing cameras, which may also incorporate various sensors. In some embodiments, the sensors 810 can capture both still and video images. In some embodiments, the sensor 810 can include RGBD or stereoscopic video cameras capable of capturing images at, e.g., 30 frames per second (fps). In one embodiment, images captured by the sensor 810 can be in a raw uncompressed format and can be compressed prior to being processed and/or stored in memory 860. In some embodiments, image compression can be performed by the processor 850 using lossless or lossy compression techniques.

In some embodiments, the processor 850 can also receive input from IMU 830. In other embodiments, the IMU 830 can comprise 3-axis accelerometer(s), 3-axis gyroscope(s), and/or magnetometer(s). The IMU 830 can provide velocity, orientation, and/or other position related information to the processor 850. In some embodiments, the IMU 830 can output measured information in synchronization with the capture of each image frame by the sensor 810. In some embodiments, the output of the IMU 830 is used in part by the processor 850 to fuse the sensor measurements and/or to further process the fused measurements.

The system 800 can also include a screen or display 880 rendering images, such as color and/or depth images. In some embodiments, the display 880 can be used to display live images captured by the sensor 810, fused images, augmented reality (AR) images, graphical user interfaces (GUIs), and other program outputs. In some embodiments, the display 880 can include and/or be housed with a touchscreen to permit users to input data via some combination of virtual keyboards, icons, menus, or other GUIs, user gestures and/or input devices such as styli and other writing implements. In some embodiments, the display 880 can be implemented using a liquid crystal display (LCD) display or a light emitting diode (LED) display, such as an organic LED (OLED) display. In other embodiments, the display 880 can be a wearable display.

In some embodiments, the result of the fusion can be rendered on the display 880 or submitted to different applications that can be internal or external to the system 800. For example, a computer vision (CV) application 855 running on the processor 850 can implement and execute computer vision based tracking, model-based tracking, and/or simultaneous localization and mapping (SLAM) methods. The CV application 855 is implemented using the neural network trained according to various embodiments.

Exemplary system 800 can also be modified in various ways in a manner consistent with the disclosure, such as, by adding, combining, or omitting one or more of the functional blocks shown. For example, in some configurations, the system 800 does not include the IMU 830 or the transceiver 870. Further, in certain example implementations, the system 800 include a variety of other sensors (not shown) such as an ambient light sensor, microphones, acoustic sensors, ultrasonic sensors, laser range finders, etc. In some embodiments, portions of the system 800 take the form of one or more chipsets, and/or the like.

The processor 850 can be implemented using a combination of hardware, firmware, and software. The processor 850 can represent one or more circuits configurable to perform at least a portion of a computing procedure or process related to sensor fusion and/or methods for further processing the fused measurements. The processor 850 retrieves instructions and/or data from memory 860. The processor 850 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 860 can be implemented within the processor 850 and/or external to the processor 850. As used herein the term "memory" refers to any type of long term, short term, volatile, nonvolatile, or other memory and is not to be limited to any particular type of memory or number of memories, or type of physical media upon which memory is stored. In some embodiments, the memory 860 holds program codes that facilitate sensor fusion and/or one or more image processing, perform SLAM, tracking, 3D reconstruction, and other tasks performed by CV 855 on processor 850.

For example, the memory 860 can store the measurements of the sensors, such as still images, depth information, video frames, program results, as well as data provided by the IMU 830 and other sensors. In general, the memory 860 can represent any data storage mechanism. The memory 860 can include, for example, a primary memory and/or a secondary memory. The primary memory can include, for example, a random access memory, read only memory, etc. While illustrated in FIG. 9 as being separate from the processors 850, it should be understood that all or part of a primary memory can be provided within or otherwise co-located and/or coupled to the processors 850.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 860 and/or the processor 850.

In some embodiments, the CV 855 can implement various computer vision methods and/or process images captured by the sensor 810. For example, the CV 855 can be configured for processing one or more images captured by the sensor 810 to perform reconstruction of an environment being modeled using the depth information associated with the captured images.

Based on the depth data, during reconstruction each pixel can be assigned a 3D coordinate. In one embodiment, the CV 855 on the processor 850 tracks the position of the camera 810 by using a monocular (single camera) visual SLAM system to build a coarse map of the environment around the MS for accurate and robust 6DOF tracking of camera 810. The term monocular refers to the use of a single non-stereoscopic camera to capture images or to images captured without depth information. Other reconstruction method can then use the camera pose and per-pixel depth information to extrude the captured image(s) along a viewing direction. For example, in one embodiment the processor 850 is configured to track an object in the scene using the fused set of measurements.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A computer-based system, comprising:
an input interface to receive an input to a neural network and labels of the input to the neural network;
a processor to solve a double layer optimization problem to produce parameters of the neural network, wherein the double layer optimization problem includes an optimization of a first layer subject to an optimization of a second layer, wherein the optimization of the first layer minimizes a difference between an output of the neural network processing the input and the labels of the input to the neural network, wherein the optimization of the second layer minimizes a distance between a non-negative output vector of each layer and a corresponding input vector to each layer, wherein the input vector of a current layer is a linear transformation of the non-negative output vector of a previous layer, wherein the double layer optimization problem is $$\min_{\tilde{U} \subseteq U, V \in V, \tilde{W} \subseteq W} \sum_i \ell(y_i, V u_{i,N}) \text{ s.t. } u_{i,n} \in \operatorname*{argmin}_u \left\| u - \sum_{m \in M_n} W_{n,m} u_{i,m} \right\|_2^2,$$

$$u_{i,n} \geq 0, u_{i,0} = x_i, \forall i, \forall n = 1, \ldots, N,$$

wherein $x_i \in \mathbb{R}^{d_0}$ is i-th training data, $y_i \in Y$ is a label from a set of Y, $u_{i,n} \in \mathbb{R}^{d_n}$ as the output vector for $x_i$ from the n-th ($1 \leq n \leq N$) hidden layer in the neural network, $W_{n,m} \in \mathbb{R}^{d_n \times d_m}$ as a weight matrix between the n-th and m-th hidden layers, $M_n$ as an index set for the n-th hidden layer, $V \in \mathbb{R}^{d_{N+1} \times d_N}$ as the weight matrix between the last hidden layer and an output layer of the neural network, U, V, W as nonempty closed convex sets, $\tilde{U}=\{u_{i,n}\}$, $\tilde{W}=\{W_{n,m}\}$, and $l(\bullet,\bullet)$ as a convex loss function; and
an output interface to output the parameters of the neural network.

2. The system of claim 1, wherein, to solve the double layer optimization problem, the processor is configured to
transform the double layer optimization problem into a single layer optimization problem by adding an objective function in the second layer into an objective function in the first layer and merging constraints in the second layer with constraints in the first layer; and
solve the single layer optimization problem by an alternating optimization (AO).

3. The system of claim 1, wherein, to solve the double layer optimization problem, the processor is configured to
transform the double layer optimization problem into a single layer optimization by adding an objective function in the second layer into an objective function in the first layer and merging constraints in the second layer with constraints in the first layer;
perform a variable replacement in the single layer optimization problem to produce a Tikhonov regularized problem with a regularization term including a matrix representing an architecture and the parameters of the neural network; and
solve the Tikhonov regularized problem with a block coordinate descent.

4. The system of claim 3, wherein the input interface receives architecture constraints indicative of the architecture of the neural network, wherein the processor solves the Tikhonov regularized problem subject to the architecture constraints.

5. The system of claim 3, wherein the processor initializes the regularization term with a number of layers of the neural network and solves the Tikhonov regularized problem subject to connectivity and symmetry constraints on blocks of the matrix.

6. The system of claim 5, wherein the input interface receives the number of layers of the neural network.

7. The system of claim 1, wherein, to solve the double layer optimization, the processor is configured to
transform the double layer optimization problem into a Tikhonov regularized problem according to $$\min_{\tilde{U} \subseteq U, V \in V, \tilde{W} \subseteq W} f(\tilde{U}, V, \tilde{W}) \triangleq$$

$$\sum_i l(y_i, Vu_{i,N}) + \sum_{i,n} \frac{\gamma_n}{2} \left\| u_{i,n} - \sum_{m \in M_n} W_{n,mn} u_{i,mn} \right\|_2^2,$$

$$\text{s.t. } u_{i,n} \geq 0, u_{i,0} = x_i, \forall i, \forall n = 1, \cdots, N,$$

wherein $\gamma_n \geq 0$, $\forall n$ are predefined regularization constants; and
perform a variable replacement by arranging u and γ terms into a matrix Q to formulate a Tikhonov regularized objective as $$\min_{\tilde{U} \subseteq U, V \in V, \tilde{W} \subseteq W} f(\tilde{U}, V, \tilde{W}) \equiv \sum_i \left\{ l(y_i, VPu_i) + \frac{1}{2} u_i^T Q(\tilde{W}) u_i \right\},$$

wherein $u_i$, $\forall i$ denotes a concatenating vector of hidden outputs and the input to the neural network, such that $u_i = [u_{i,n}]_{n=0}^N$, $\forall i$, P is a predefined constant matrix so that $Pu_i = u_{i,N}$, $\forall i$, and $Q(\tilde{W})$ is a matrix constructed by the weight matrix set $\tilde{W}$; and
solve the Tikhonov regularized problem with a block coordinate descent.

8. The system of claim 7, wherein the processor using the block coordinate descent determines a set of variables iteratively, wherein, for each iteration, the block coordinate descent updates a variable from the set of variables while fixing other variables in the set.

9. The system of claim 1, further comprising:
an application interface to perform a computer-based application using the neural network.

10. A computer-based method, wherein the method uses a processor coupled with stored instructions implementing the method, wherein the instructions, when executed by the processor carry out the method, comprising:
receiving ground truth labels of input to a neural network;
solving a double layer optimization problem includes minimizing a difference between an output of the neural network processing the input to the neural network and the ground truth labels of the input to the neural network to produce parameters of the neural network, wherein the minimizing the difference is a first layer of the double layer optimization problem that is subject to minimizing a distance between a non-negative output vector of each layer and a corresponding input vector to each layer forming a second layer of the double layer optimization problem, wherein the input vector of a current layer is a linear transformation of the non-negative output vector of a previous layer, wherein the double layer optimization problem is $$\min_{\tilde{U} \subseteq U, V \in V, \tilde{W} \subseteq W} \sum_i \ell(y_i, Vu_{i,N}) \text{ s.t. } u_{i,n} \in \arg\min_u \left\| u - \sum_{m \in M_n} W_{n,m} u_{i,m} \right\|_2^2,$$

$$u_{i,n} \geq 0, u_{i,0} = x_i, \forall i, \forall n = 1, \ldots, N,$$

wherein $x_i \in R^{d_0}$ is i-th training data, $y_i \in Y$ is a label from a set of Y, $u_{i,n} \in R^{d_n}$ as the output vector for $x_i$ from the n-th ($1 \leq n \leq N$) hidden layer in the neural network, $W_{n,m} \in R^{d_n \times d_m}$ as a weight matrix between the n-th and m-th hidden layers, $M_n$ as an index set for the n-th hidden layer, $V \in R^{d_{N+1} \times d_N}$ as the weight matrix between the last hidden layer and an output layer of the neural network, U, V, W as nonempty closed convex sets, $\tilde{U} = \{u_{i,n}\}$, $\tilde{W} = \{W_{n,m}\}$, and $l(\bullet, \bullet)$ as a convex loss function; and
outputting the parameters of the neural network.

11. The method of claim 10, wherein the solving comprises:
transforming the double layer optimization problem into a single layer optimization problem by adding an objective function in the second layer into an objective function in the first layer and merging constraints in the second layer with constraints in the first layer; and
solving the single layer optimization problem by an alternating optimization (AO).

12. The method of claim 10, further comprising:
transforming the double layer optimization problem into a single layer optimization problem by adding an objective function in the second layer into an objective function in the first layer and merging constraints in the second layer with constraints in the first layer;
performing a variable replacement in the single layer optimization problem to produce a Tikhonov regularized problem with a regularization term including a matrix representing an architecture and the parameters of the neural network; and
solving the Tikhonov regularized problem with a block coordinate descent.

13. The method of claim 12, further comprising:
receiving architectural constraints indicative of the architecture of the neural network; and
solving the Tikhonov regularized problem subject to the architectural constraints.

14. The method of claim 12, further comprising:
initializing the regularization term with a number of layers of the neural network; and solving the Tikhonov regularized problem subject to connectivity and symmetry constraints on blocks of the matrix.

15. The method of claim 14, further comprising:
receiving the number of layers of the neural network.

16. The method of claim 10, further comprising:
transforming the double layer optimization problem into a Tikhonov regularized problem according to $$\min_{\tilde{U} \subseteq U, V \in V, \tilde{W} \subseteq W} f(\tilde{U}, V, \tilde{W}) \triangleq$$

$$\sum_i l(y_i, Vu_{i,N}) + \sum_{i,n} \frac{\gamma_n}{2} \left\| u_{i,n} - \sum_{m \in M_n} W_{n,mn} u_{i,mn} \right\|_2^2,$$

$$\text{s.t. } u_{i,n} \geq 0, u_{i,0} = x_i, \forall i, \forall n = 1, \cdots, N,$$

wherein $\gamma_n \geq 0$, $\forall n$ are predefined regularization constants; and performing a variable replacement by arranging u and γ terms into a matrix Q to formulate a Tikhonov regularized objective as $$\min_{\tilde{U} \subseteq U, V \in V, \tilde{W} \subseteq W} f(\tilde{U}, V, \tilde{W}) \equiv \sum_i \left\{ l(y_i, VPu_i) + \frac{1}{2} u_i^T Q(\tilde{W}) u_i \right\},$$

wherein $u_i$, $\forall i$ denotes a concatenating vector of hidden outputs and the input to the neural network, such that $u_i = [u_{i,n}]_{n=0}^{N}$, P is a predefined constant matrix so that $Pu_i = u_{i,N}$, $\forall i$, and $Q(\tilde{W})$ is a matrix constructed by the weight matrix set $\tilde{W}$; and solving the Tikhonov regularized problem with a block coordinate descent.

17. The method of claim 16, wherein the solving using the block coordinate descent solves a set of variable iteratively, wherein, for each iteration, the block coordinate descent updates a variable from the set of variables while fixing other variables in the set, such that the block coordinate descent returns solutions that are guaranteed to converge globally and being critical points in a space of parameters of the double layer optimization problem.

18. A non-transitory computer readable storage medium embodied thereon a program executable by a processor for performing a method, the method comprising:

receiving ground truth labels of input to a neural network;

solving a double layer optimization problem includes minimizing a difference between an output of the neural network processing the input to the neural network and the ground truth labels of the input to the neural network to produce parameters of the neural network, wherein the minimizing the difference is a first layer of the double layer optimization problem that is subject to minimizing a distance between a non-negative output vector of each layer and a corresponding input vector to each layer forming a second layer of the double layer optimization problem, wherein the input vector of a current layer is a linear transformation of the non-negative output vector of a previous layer, wherein the double layer optimization problem is $$\min_{\tilde{U} \subseteq U, V \in V, \tilde{W} \subseteq W} \sum_i f(y_i, Vu_{i,N}) \text{ s.t. } u_{i,n} \in \operatorname*{argmin}_u \left\| u - \sum_{m \in M_n} W_{n,m} u_{i,m} \right\|_2^2,$$

$$u_{i,n} \geq 0, u_{i,0} = x_i, \forall i, \forall n = 1, \ldots, N,$$

wherein $x_i \in \mathbb{R}^{d_0}$ is i-th training data, $y_i \in Y$ is a label from a set of Y, $u_{i,n} \in \mathbb{R}^{d_n}$ as the output vector for $x_i$ from the n-th ($1 \leq n \leq N$) hidden layer in the neural network, $W_{n,m} \in \mathbb{R}^{d_n \times d_m}$ as a weight matrix between the n-th and m-th hidden layers, $M_n$ as an index set for the n-th hidden layer, $V \in \mathbb{R}^{d_{N+1} \times d_N}$ as the weight matrix between the last hidden layer and an output layer of the neural network, U, V, W as nonempty closed convex sets, $\tilde{U} = \{u_{i,n}\}$, $\tilde{W} = \{W_{n,m}\}$, and $l(\cdot, \cdot)$ as a convex loss function; and outputting the parameters of the neural network.

* * * * *